E. M. SELIGA.
AUTOMOBILE HEADLIGHT.
APPLICATION FILED JULY 5, 1917.
1,312,054.
Patented Aug. 5, 1919.
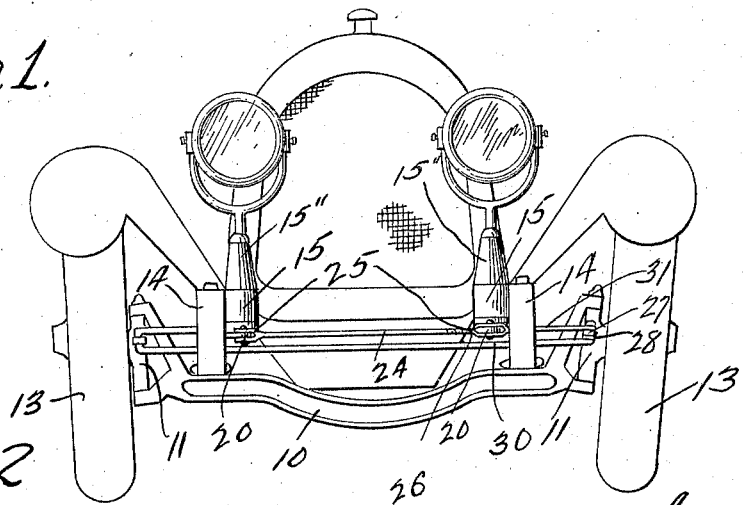
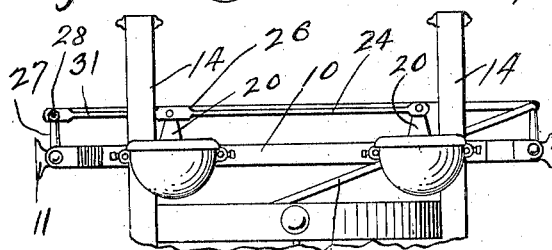
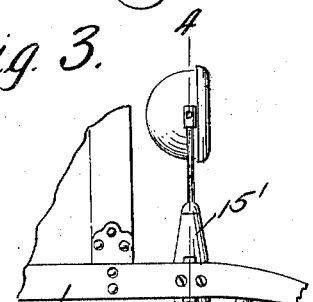
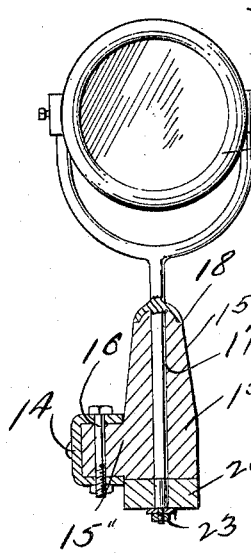
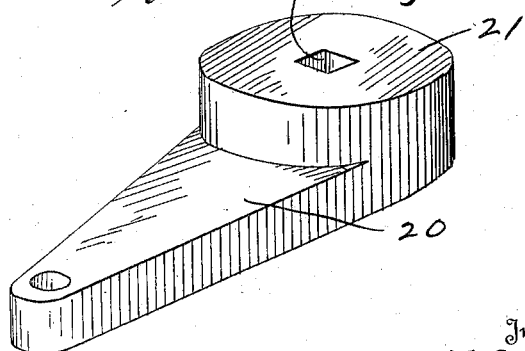
Inventor
E. M. Seliga,

UNITED STATES PATENT OFFICE.

EDWARD M. SELIGA, OF ST. LOUIS, MISSOURI.

AUTOMOBILE-HEADLIGHT.

1,312,054.              Specification of Letters Patent.         Patented Aug. 5, 1919.

Application filed July 5, 1917. Serial No. 178,615.

*To all whom it may concern:*

Be it known that I, EDWARD M. SELIGA, a citizen of the United States, residing at St. Louis, in the county of St. Louis City, State of Missouri, have invented certain new and useful Improvements in Automobile-Headlights; and I do hereby declare the following to be a full, clear, and exact description of the invention, such as will enable others skilled in the art to which it appertains to make and use the same.

This invention relates to improvements in headlights and particularly to dirigible headlights for automobiles.

One object of the present invention is to provide a simple and effective device of this character which can readily be applied to the ordinary automobile without any great modifications to the automobile or headlights.

Another object is to provide a novel and effective mechanism for connecting the headlights to the steering knuckles of the front wheels for the purpose of automatically turning the lamps simultaneously with the front wheels.

Other objects and advantages will be apparent from the following description when taken in connection with the accompanying drawing.

In the drawing:

Figure 1 is a front elevation of an automobile equipped with my improved headlight mechanism.

Fig. 2 is a top plan view of the headlight mechanism, the automobile being partly broken away to show the mechanism more clearly.

Fig. 3 is a side elevation of the mechanism, the automobile being partly broken away.

Fig. 4 is a vertical sectional view taken on the line 4—4 of Fig. 3.

Fig. 5 is a perspective view of the lamp turning member removed.

Fig. 6 is a detail view.

Referring particularly to the accompanying drawing 10 represents the front axle of the automobile, and 11 the steering knuckles of the front wheels 13. The side bars 14 of the chassis of the automobile are in the form of angular U-shaped bars, as shown in Fig. 4. A member 15 is formed with a horizontally extending portion 15' which is disposed within the channel of the bar 14, and disposed vertically through the bar and the portion 15' is a pivot bolt 16. The vertical portion of the member 15, is in the form of a standard 15'', and formed vertically through this member 15 is a bore 17 which receives the post 18 of the lamp 19. An arm 20 is disposed below the member 15 and has a boss 21 disposed in contacting relation with the lower face of the member 15, said boss being formed with a vertical opening 22 for the reception of the bolt 16 therethrough. A nut 23 is engaged on the lower end of the bolt to hold the parts together.

As clearly seen in the drawing, there are the same parts mounted in a similar manner at the other side of the automobile, and pivotally connecting the arms 20 is a link 24, the ends being bifurcated, as shown at 25, for straddling engagement with the said arms. One end of the link is longitudinally adjustable by means of the threaded connection 26, whereby the device is readily adaptable to automobiles of different types wherein the lamps and chassis bars are disposed at different distances apart.

Secured to the knuckle of one of the front wheels is a member 27, which is connected to the steering rod 30 at 28, and is pivotally connected to the adjacent arm 20, by means of a link 31.

It will thus be seen that when the front wheels are moved, as in steering the automobile, the links will communicate movement to the posts of the lamps and swing said lamps in the same direction as the wheels, whereby the light from the lamps will be thrown on the road directly ahead of the automobile.

Attention is particularly called to the peculiar construction of the members 15, whereby they are arranged to be mounted in the channels of the side bars of the chassis of the automobile.

What is claimed is:

The combination with the channeled chassis of an automobile, of a headlight support including a substantially L-shaped member having a vertical bore therethrough, the horizontal portion of the L-shaped member being vertically apertured and seated in the channel of the chassis and secured therein against movement with respect thereto, a lamp post disposed for rotation in said bore and extending below the lower end of the L-shaped member, said post having a flange bearing on the upper end of the vertical portion of the L-shaped member, a crank arm secured on the lower end of the said post and rotatable therewith, said arm having a boss on the upper side engaging with the lower end of the L-shaped member to space the remaining portion of the arm below and out of contact with the chassis, and connections between the arm and steering mechanism of the automobile.

In testimony whereof, I affix my signature in the presence of two witnesses.

EDWARD M. SELIGA.

Witnesses:
C. J. SELIGA,
GEO. F. SCHMIDT.

Copies of this patent may be obtained for five cents each, by addressing the "Commissioner of Patents, Washington, D. C."